US005742895A

United States Patent [19]

Tanigawa et al.

[11] Patent Number: 5,742,895

[45] Date of Patent: Apr. 21, 1998

[54] DEVICE FOR TRANSMITTING AND RECEIVING INFORMATION SIGNAL IN MULTIMEDIA COMMUNICATION SYSTEM

[75] Inventors: Yoshihiro Tanigawa, Kyoto; Shinji Morino, Moriguchi; Isao Shimada, Takarazuka; Masafumi Morimoto, Toyonaka; Koji Ikeda, Kyoto; Sadaaki Kondo; Kimitake Okugawa, both of Moriguchi, all of Japan

[73] Assignee: Matsushita Electric Works, Ltd., Kadoma, Japan

[21] Appl. No.: 667,636

[22] Filed: Jun. 21, 1996

[30] Foreign Application Priority Data

Jan. 26, 1996 [JP] Japan .................................... 8-012167

[51] Int. Cl.[6] ...................................................... H04B 1/38

[52] U.S. Cl. ............................ 455/90; 455/73; 455/575; 342/51; 361/679

[58] Field of Search ................................ 455/90, 575, 73; 342/42, 50, 51; 361/679; 439/374; 52/27, 39; 248/906

[56] References Cited

U.S. PATENT DOCUMENTS

| | | | |
|---|---|---|---|
| 4,032,707 | 6/1977 | Trenary . | |
| 5,218,356 | 6/1993 | Knapp | 342/350 |
| 5,235,337 | 8/1993 | Clark et al. | 361/814 |
| 5,333,418 | 8/1994 | Chambers | 52/39 |
| 5,424,859 | 6/1995 | Uchara et al. | 455/90 |

*Primary Examiner*—Donnie L. Crosland
*Attorney, Agent, or Firm*—Burns, Doane, Swecker & Mathis, L.L.P.

[57] ABSTRACT

A device used in a multimedia communication system is formed with a transceiver unit for transmitting and receiving information signal to and from the inside of a room and a base unit adapted to be mounted to a wall of the room to detachably support the transceiver unit. The transceiver unit has a plug surface on which a plug projects, a circular wall projecting on the plug surface to surround the plug, and a guide wall projecting on the plug surface inside the circular wall and around the plug. The base unit comprises a disk member which is provided with a receptacle exposed in a receptacle surface defined on the disk member. The disk member has a diameter slightly smaller than an inner diameter of the circular wall so that the disk member can fit within the circular wall when the transceiver unit is attached to the base. The disk member is formed in the receptacle surface with a guide groove of such a configuration that the guide wall is allowed to be inserted into the guide groove only when the guide wall opposes to the guide groove at a particular angular orientation where the plug comes to be connectable with the receptacle. The device can provide a safe and easy working condition for attaching the transceiver unit to the base unit.

10 Claims, 16 Drawing Sheets

DEVICE FOR TRANSMITTING AND RECEIVING INFORMATION SIGNAL IN MULTIMEDIA COMMUNICATION SYSTEM

BACKGROUND ART

1. Field of the Invention

The present invention relates to a device for receiving and transmitting information signal in a multimedia communication system, and particularly, a combination of a transceiver unit for transmitting and receiving the information signal and a base unit adapted to be mounted to a wall to detachably support the transceiver unit.

2. Disclosure of the Prior Art

Multimedia communication systems such as Local Area Network (LAN), or Personal Handy-phone System (PHS), have been widely used to transmit and receive information signals for, e.g., communication, countermeasure against disaster, crime prevention, or remote control of electric appliances. In the multimedia communication systems, a device for receiving and transmitting the information signals is used. For example, the device is formed with a transceiver unit for transmitting and receiving an information signal to and from the inside of a room and a base unit adapted to be mounted to a wall or ceiling of the room to detachably support the transceiver unit. The transceiver unit has a modular plug mounted therein and connected to an electric circuit for transmitting and receiving the information signal. The base unit has a modular jack connected to an information transmission line routed within the wall. In general, the modular plug is configured so as to be allowed to engage with the modular jack only when the modular plug opposes to the modular jack at a particular angular orientation. When the base unit is mounted to the ceiling of the room, a user must attach the transceiver unit to the base unit while seeing the angular orientation of the modular plug relative to the modular jack by the user's own eyes. This fact means that the user must go up a footstool or the like to a height at which the user can see the angular orientation of the modular plug relative to the modular jack by the user's eyes, and then attach the transceiver unit to the base. Therefore, there causes a problem that the user must attach the transceiver unit to the base unit under a dangerous working condition. At the worst, a serious injury of the user will be caused by a fall of the user from the height.

On the other hand, when a transceiver unit has a modular plug which is connected to a plug code extending from a body of the transceiver unit, and a base unit is mounted to a ceiling, the user will have to attach the transceiver unit to the base unit under a dangerous and difficult working condition. That is, the user must hold the body of the transceiver unit with its one hand and insert the modular plug into a modular jack of the base unit with the other hand to attach the transceiver unit to the base unit. Therefore, it will be difficult for the user to balance itself on the footstool. It means that the user must attach the transceiver unit to the base unit under a dangerous working condition. When the user tries to insert the modular plug into the modular jack with its one hand without holding the body of the transceiver unit with the other hand, there is a possibility of causing the breaking of the plug code because of the weight of the transceiver unit. In addition, it would be difficult to accurately insert the modular plug into the modular jack at a particular angular orientation where the modular plug is allowed to be inserted into the modular jack. As a result, there is a possibility of pushing the modular plug to the modular jack at a wrong angular orientation, so that the breakage of the modular plug and/or modular jack will be often caused.

Thus, it is desired to provide an improved combination of the transceiver unit and base unit, in which the transceiver unit can be readily attached to the base unit under a safe working condition, without causing the breakage of the modular jack and modular plug.

SUMMARY OF THE INVENTION

For improving and eliminating the above problems, the present invention is directed to a device used in a multimedia communication system which comprises a transceiver unit for transmitting and receiving information signal to and from the inside of a room, and a base unit adapted to be mounted to a wall of the room to detachably support the transceiver unit. The base unit has a receptacle electrically connected to an information transmission line routed within the wall. The transceiver unit includes an electric circuit for transmitting and receiving the information signal and a housing with a plug and hooks. The plug is electrically connected to the electric circuit and projects on a plug surface defined on the housing to be detachably connected to the receptacle of the base unit for establishing a signal communication between the electric circuit and the information transmission line. The hooks project on the plug surface to detachably engage into corresponding grooves formed in the base unit for attaching the transceiver unit to the base.

The device of the present invention is characterized in the following structures. That is, the base unit comprises a disk member which is provided with the receptacle and the grooves exposed in a receptacle surface defined on the disk member. The housing of the transceiver unit is formed with a circular wall projecting on the plug surface to surround the plug and hooks, and a guide wall projecting on the plug surface inside the circular wall and around the plug. The disk member has a diameter slightly smaller than an inner diameter of the circular wall so that the disk member can fit within the circular wall when the transceiver unit is attached to the base unit. The disk member is formed in the receptacle surface with a guide groove of such a configuration that the guide wall is allowed to be inserted into the guide groove only when the guide wall opposes to the guide groove at a particular angular orientation where the plug comes to be connectable with the receptacle.

The above-explained device of the present invention can provide the following advantages. That is, a user can engage the plug to the receptacle by inserting the guide wall into the guide groove. The guide wall can be readily inserted into the guide groove by fitting the disk member of the base unit within the circular wall of the transceiver unit, and then sliding the circular wall along the circumference of the disk member to find the particular angular position of the guide wall relative to the guide groove. Since the transceiver unit is always pushed against the base unit during the sliding operation, the guide wall can be inserted into the guide groove immediately when the guide wall opposes to the guide groove at the particular angular orientation. Thus, it is possible to readily engage the plug into the receptacle, without seeing the angular orientation of the plug relative to the receptacle by the user's own eyes. Therefore, even when the base unit is mounted to a ceiling, the user has only to go up a footstool or the like at a height where the transceiver unit lifted overhead with the user's hand reaches to the base unit mounted to the ceiling, to attach the transceiver unit to the base unit. In other words, the user need not go up the footstool or the like to a higher position, where the user can see the angular orientation of the plug relative to the receptacle by the user's eyes, to attach the transceiver unit to the base unit. Consequently, it is possible to provide a safe and easy working condition for attaching the transceiver unit to the base unit. In addition, since the plug can not be inserted into the receptacle when the guide wall opposes to the guide groove at a wrong angular orientation, it is possible to prevent the breakage of the plug and receptacle.

Therefore, a primary object of the present invention is to provide a device for receiving and transmitting information signal in a is multimedia communication system, which is characterized in that a transceiver unit for transmitting and receiving the information signal to and from the inside of a room can be safely and readily attached detachably to a base unit adapted to be mounted to a wall of the room.

In a preferred embodiment of the present invention, the guide wall is formed into a generally U-shaped configuration, or D-shaped configuration. In particular, the guide wall of the U-shaped configuration is formed with a pair of linear walls extending parallel to each other and an arcuate wall extending between the linear walls and having a notch. A projection is formed in the guide groove such that the guide wall is allowed to be inserted into the guide groove when the projection is fitted to the notch.

In a further preferred embodiment of the present invention, the housing of the transceiver unit comprises a stationary portion defined by a part of the plug surface on which the guide wall and plug project, and a rotatable portion rotatably relative to the stationary portion about a center axis of the circular wall. The rotatable portion carries the hooks such that the hooks are allowed to engage to the grooves in the receptacle surface of the base unit when the rotatable portion is rotated relative to the stationary portion by a certain angular distance, while the plug being kept connected with the receptacle. In other words, after the guide wall is inserted into the guide groove, the user can engage the hooks to the grooves of the base unit by rotating the rotatable portion relative to the base unit by the angular distance about the center axis of the circular wall, without rotating the stationary portion relative to the base unit. As a result, it is possible to prevent the occurrence of a is torsional moment in the plug connected to the receptacle during the rotating operation of engaging the hooks to the grooves of the base unit.

In another preferred embodiment of the present invention, a case is fixed in the wall to movably support the base unit between a projecting position where the disk member projects on the wall and a retracted position where the disk member retracts within the wall. A spring is connected between the base unit and the case to bias the base unit toward the projecting position. The housing of the transceiver unit also includes a catching unit for keeping the base unit into the retracted position when the transceiver unit is attached to the base unit. The disk member is exposed to the room at the projecting position such that the circular wall of the transceiver unit can be readily fitted to the disk member of the base unit. On the other hand, since the transceiver unit is attached to the base unit at the retracted position, it would be possible to improve a problem that the attached transceiver unit spoils the beauty of the room.

In still another preferred embodiment of the present invention, the base unit includes power terminals to be connected to a power line routed within the wall. The hooks of the transceiver unit are made of electrically conductive material and connected to the electric circuit of the transceiver unit. The power terminals are disposed adjacent to the grooves of the base unit such that the hooks are engaged with the power terminals when the transceiver unit is attached to the base unit by engagement of the hooks into the grooves, so that the electric circuit is fed with electric power from the power line through the hooks. Thus, the present device has a simplified structure for mechanically and electrically connecting the transceiver unit to the base unit.

Alternatively, the device of the present invention is characterized in the following structures. That is, the base unit has a receptacle surface in which the receptacle and grooves exposed. A cylindrical wall projects on the receptacle surface to surround the receptacle and grooves. In addition, a guide groove is formed in the receptacle surface inside the cylindrical wall and around the receptacle. The housing has a columnar stand on which the plug surface is defined. The columnar stand has a diameter slightly smaller than an inner diameter of the cylindrical wall so that the columnar stand can fit within the cylindrical wall when the transceiver unit is attached to the base. The columnar stand also has a guide wall projecting on the plug surface in such a configuration that the guide wall is allowed to be inserted into the guide groove only when the guide wall opposes to the guide groove at a particular angular orientation where the plug comes to be connectable with the receptacle.

A user can readily insert the guide wall into the guide groove by fitting the columnar stand within the cylindrical wall, and then sliding the columnar stand along the cylindrical wall, while lightly pushing the transceiver unit against the base unit, to find the particular angular position of the guide wall relative to the guide groove. Therefore, the present device can provide to the user a safe and easy working condition for attaching the transceiver unit to the base unit mounted to a wall or ceiling. In addition, since the electric circuit can be incorporated in the columnar stand, the present device can improve the problem that the transceiver unit attached to the base unit spoils the beauty of the room.

These and still other objects and advantages will become apparent from the following description of the preferred embodiments of the invention when taken in conjunction with the attached drawings.

DETAILED DESCRIPTION OF THE PREFERRED EMBODIMENTS

[FIRST EMBODIMENT]

A device for transmitting and receiving information signal in a multimedia communication system is explained referring to FIGS. 1 to 10. The device is formed with a transceiver unit 5 for transmitting and receiving information signal to and from the inside of a room and a base unit 4 adapted to be mounted to a wall or ceiling of the room to detachably support the transceiver unit.

Figure 1:
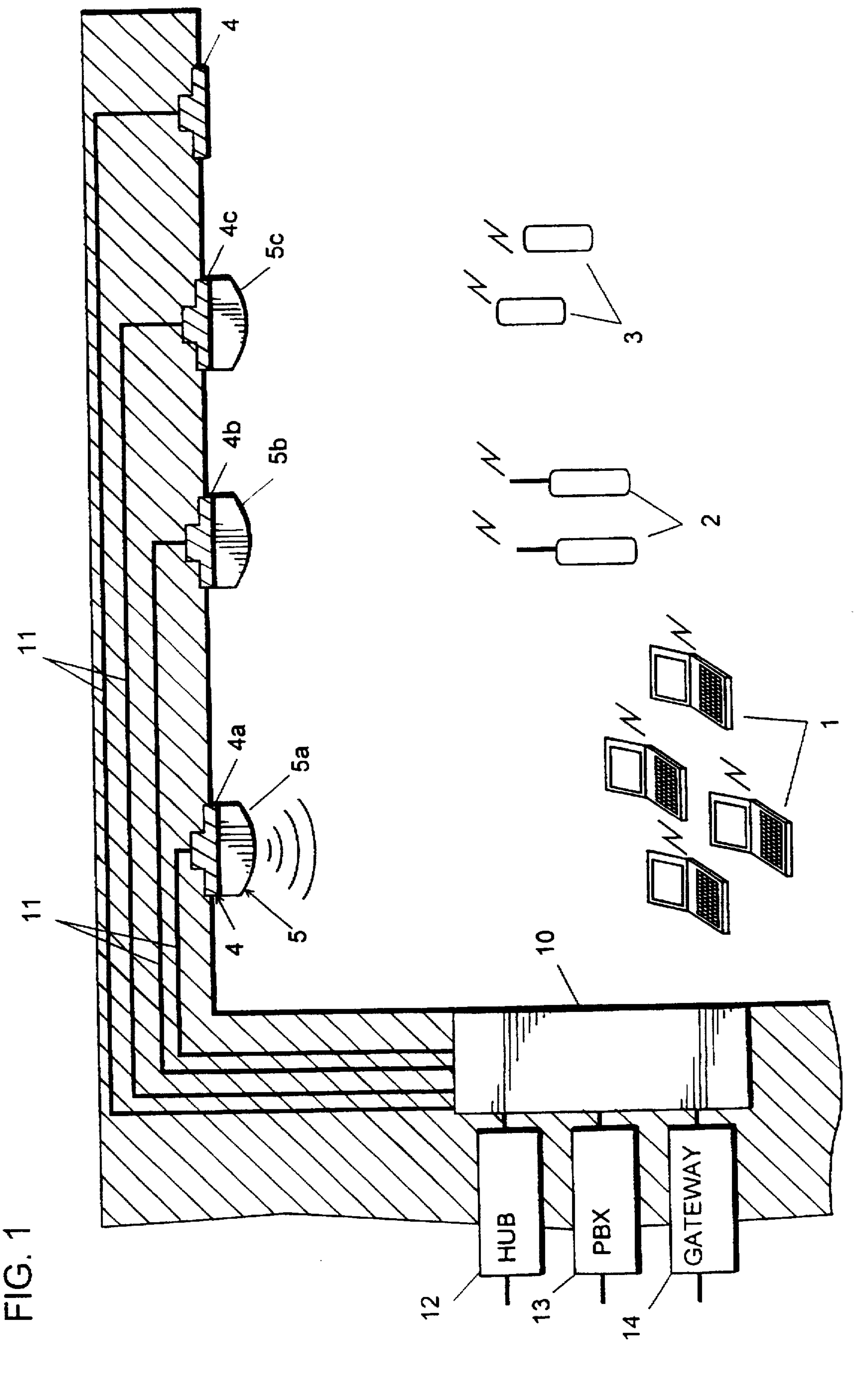
FIG. 1 shows a multimedia communication system with a device for transmitting and receiving information signal of a first embodiment of the present invention.

As shown in FIG. 1. the multimedia communication system comprises an exchange box 10, a plurality of the base units 4 connected to the exchange box by way of signal transmission lines 11 wired in the wall, and a plurality of the transceiver units 5. The exchange box 10 is connected to different interfaces composed of a hub 12 for LAN (Local Area Network), PBX (Private Branch Exchange) 13, and a gateway 14 for a building automation network. The base units 4 are mounted to the ceiling of the room. In FIG. 1, the numeral 1 designates personal computers with modem units for making the LAN. The numeral 2 designates personal handy phones for wireless communication. The numeral 3 designates remote controller units for controlling electric appliances such as lighting fixtures.

Each of the transceiver units 5 is detachably attached to the corresponding base unit 4. In the system of FIG. 1, the transceiver unit **5*a* is used for wireless communication with the personal computers 1. The transceiver unit 5*b* is used for wireless communication with the personal handy phones 2. The transceiver unit 5*c* is used for wireless communication with the remote controller units 3. These transceiver units 5*a*–5*c* can be attached to the respective base units 4*a*–4*c*. For example, an information signal is sent to the transceiver unit 5*a* through the signal transmission line 11, and then transmitted from the transceiver unit 5*a* to the personal computers 1 in the room. On the other hand, an information signal transmitted from the personal computer 1 is received by the transceiver unit 5*a*, and then sent to the outside of the room through the transmission line 11**.

Figure 2:
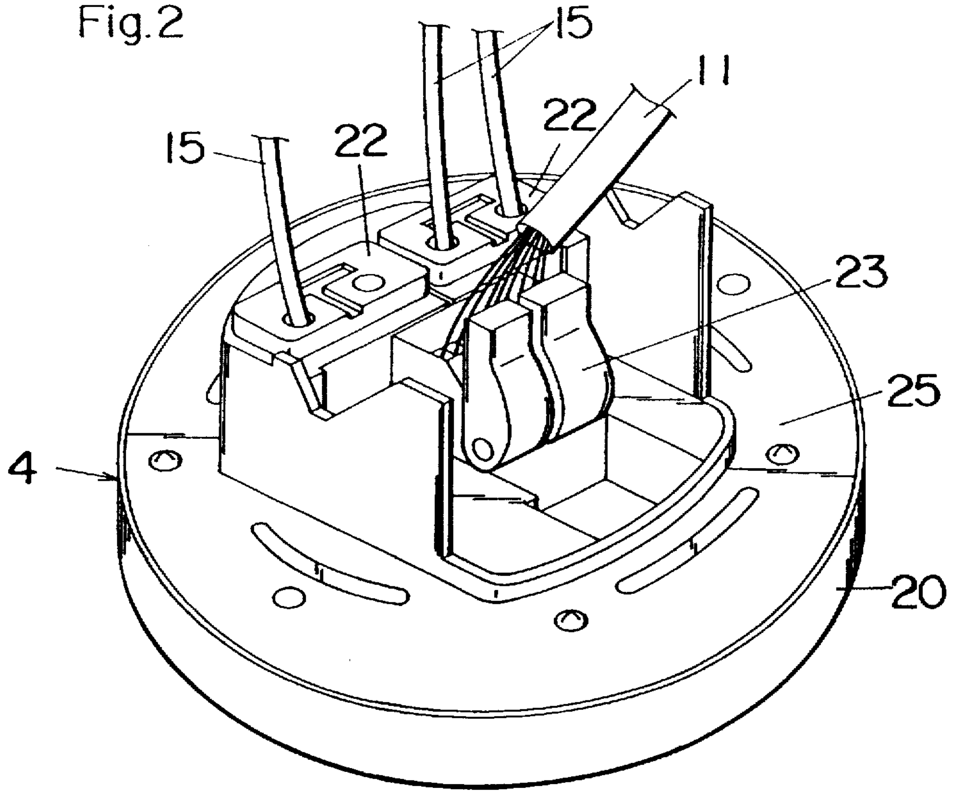
FIG. 2 is a rear perspective view of a base unit of the first embodiment.
Figure 3:
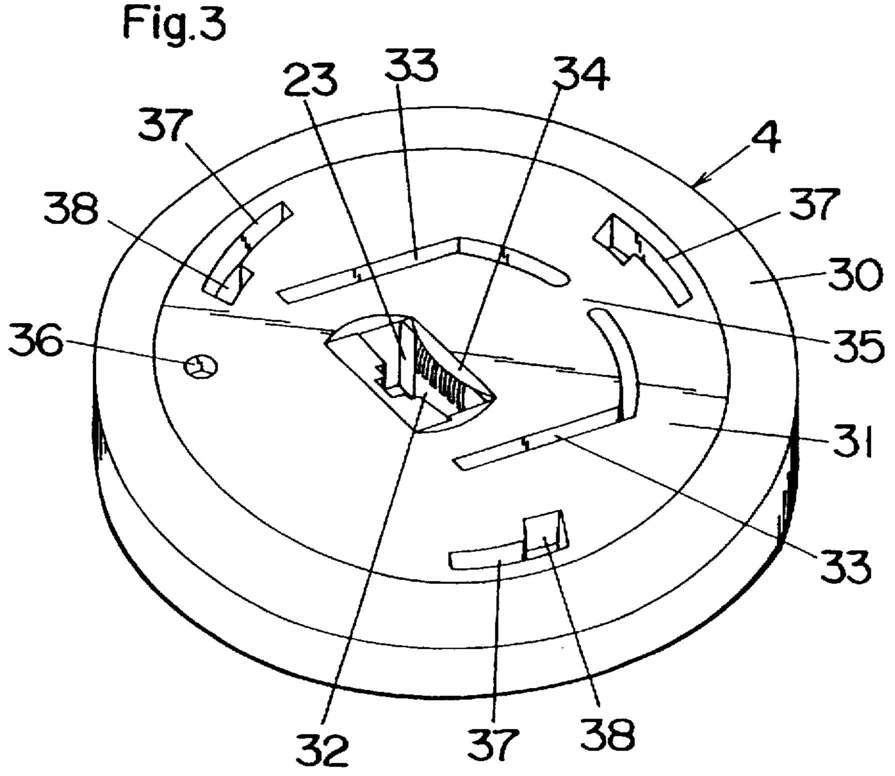
FIG. 3 is a front perspective view of the base unit.
Figure 4:
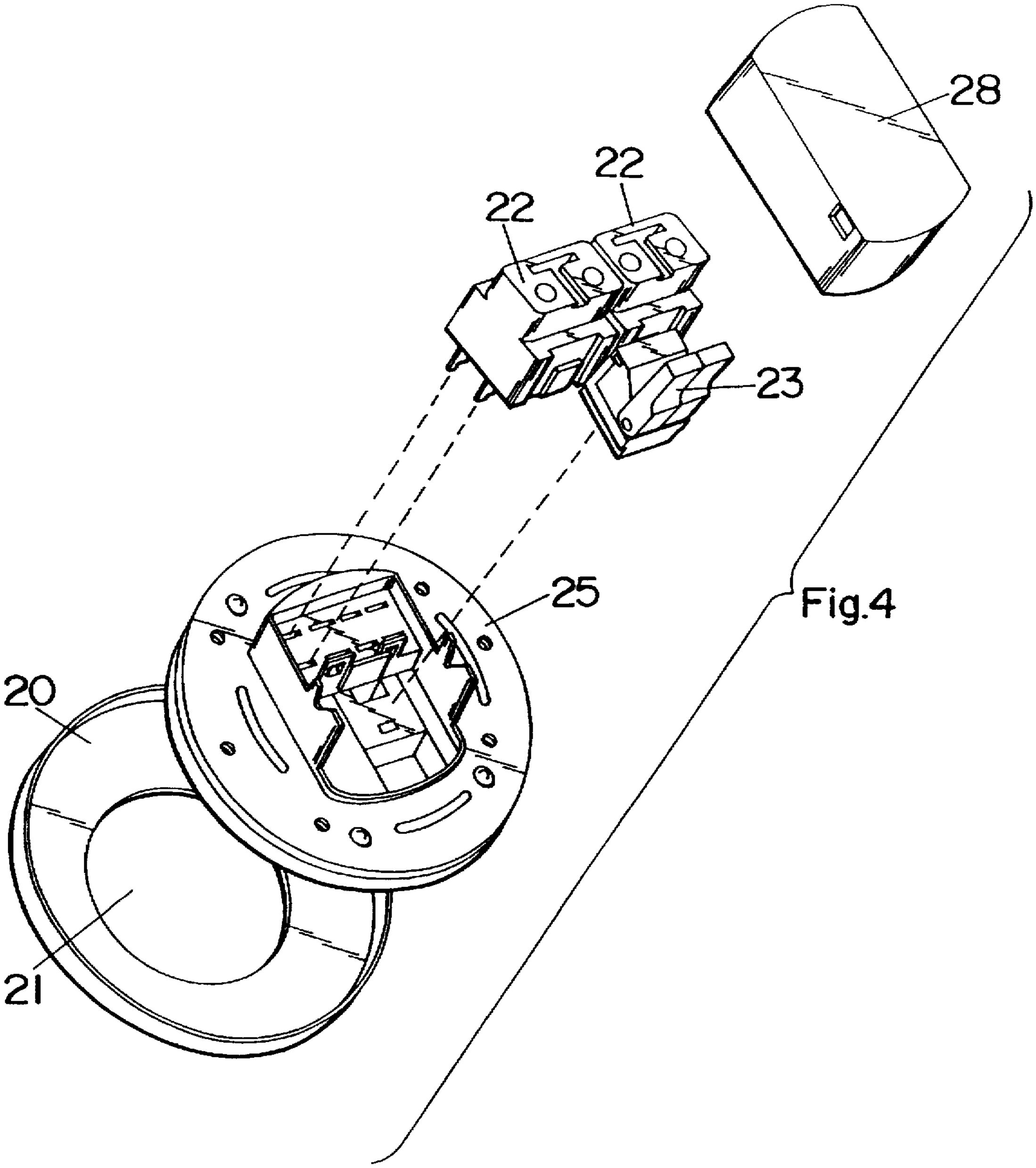
FIG. 4 is an exploded perspective view of the base unit.

As shown in FIGS. 2 to 4, the base unit 4 is formed with a front cover 20, terminal boxes 22 connected to power lines 15 routed within a wall, modular jack 23 connected to the information transmission line 11, a body 25 to which the terminal boxes 22 and modular jack 23 are mounted, and a rear cover 28. A modular-jack surface 31 is defined on a surface on the body 25, as shown in FIG. 3. The base unit 4 is mounted to the ceiling such that a disk portion 30 of the base unit 4 projects from the ceiling. The modular-jack surface 31 is exposed to the room through the center hole 21 of the front cover 20. The modular jack 23 is fixed to the body 25 in a hole 32 formed in the vicinity of the center of the modular-jack surface such that the top of the modular jack is disposed under the modular-jack surface 31. A pair of guide grooves 33 are formed in the modular-jack surface 31 to make a substantially U-shaped configuration. That is, the guide grooves 33 are provided with a pair of linear grooves extending parallel each other, arcuate grooves each extending from one end of the linear groove, and a partition 35 between the arcuate grooves. The guide grooves 33 are formed in the modular-jack surface 31 such that the modular jack 23 is surrounded with the guide grooves, as shown in FIG. 3.

Figure 7A:
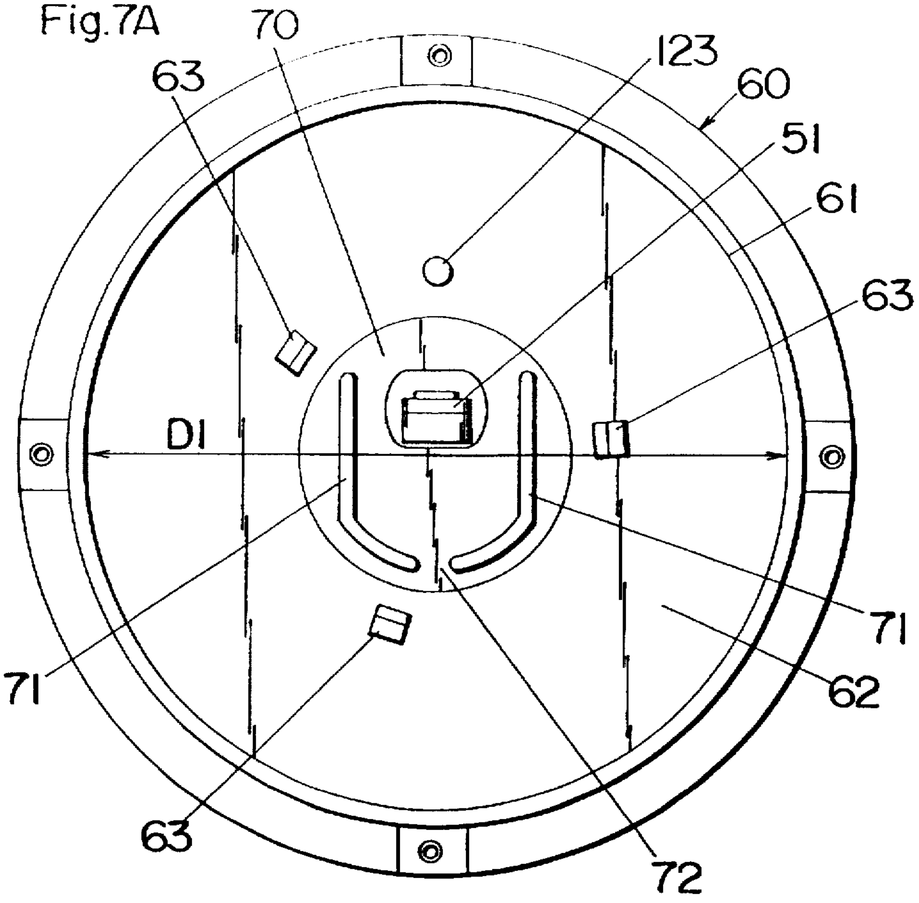
FIGS. 7A and 7B are top plan views of the transceiver unit and base unit, respectively.
Figure 7B:
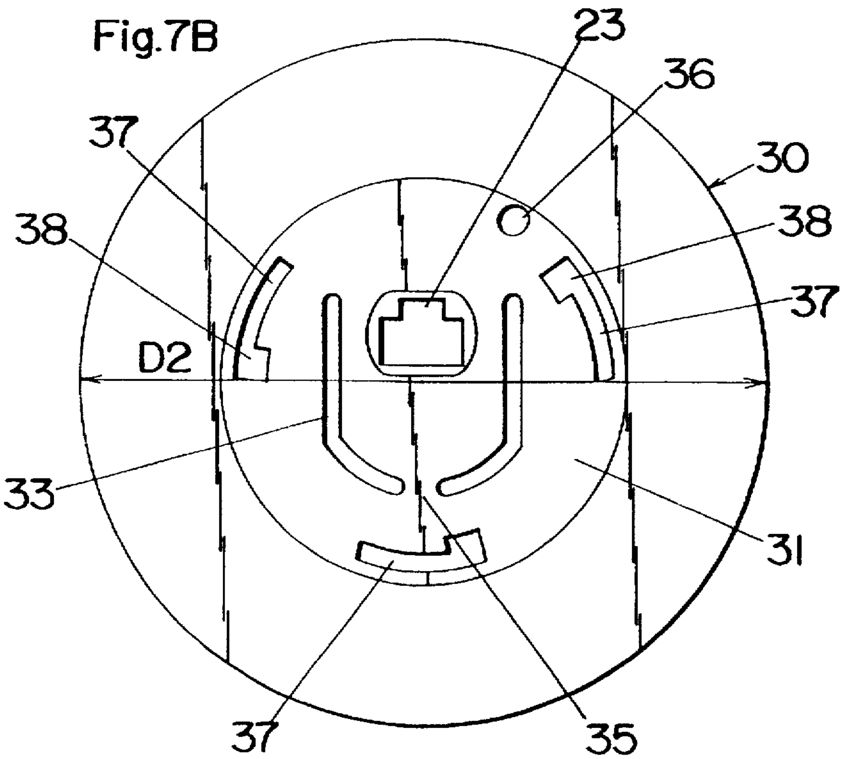

Three elongate slots 37 are formed in the modular-jack surface 31 around the guide grooves 33, and circumferentially spaced away from each other by 120 degrees about a center of the modular jack surface, as shown in FIG. 7B. Each of the slots 37 has at its one end a wide opening 38 to which a hook 63 of the transceiver unit 5 can be inserted. Output terminals (not shown) are mounted to the body 25 in the elongate slots 37. The output terminals are electrically connected to the power lines 15 through the terminal boxes 22. The numeral 34 designates a shutter formed in the hole 32 of the body 25 to protect the modular jack 23 from moisture and dust when the transceiver unit 5 is removed from the base unit 4. The shutter 34 can be readily opened and closed by the user's finger.

Figure 5:
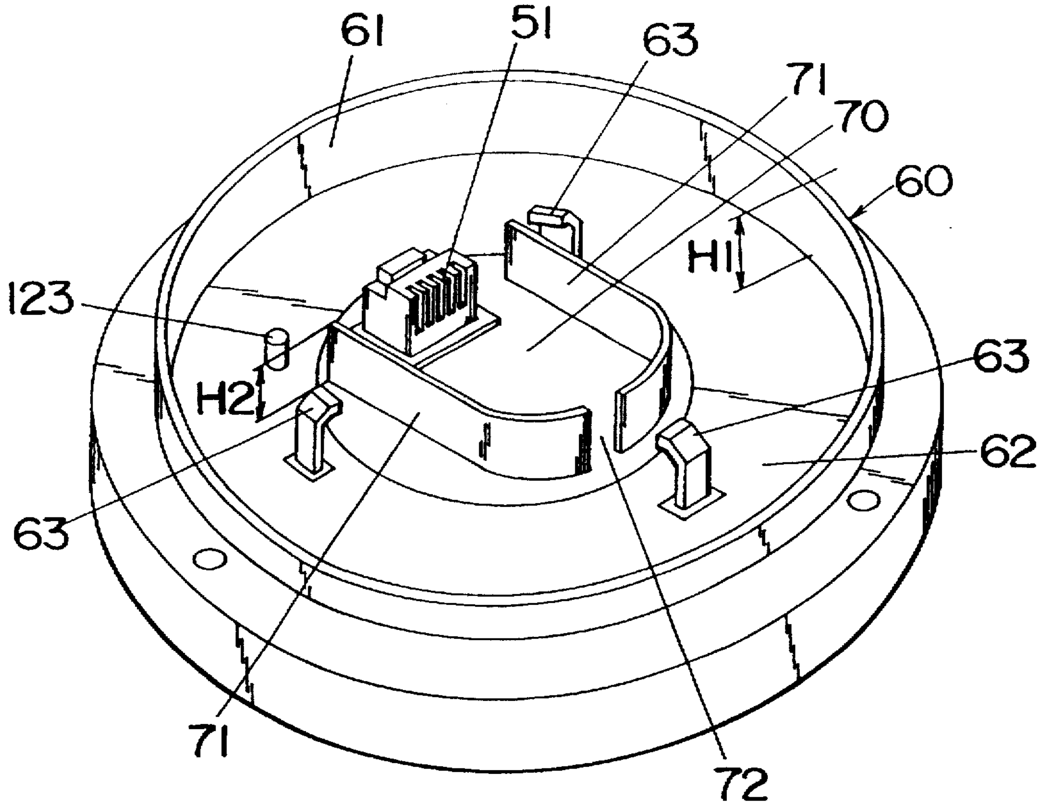
FIG. 5 is a perspective view of a transceiver unit of the first embodiment.
Figure 6:
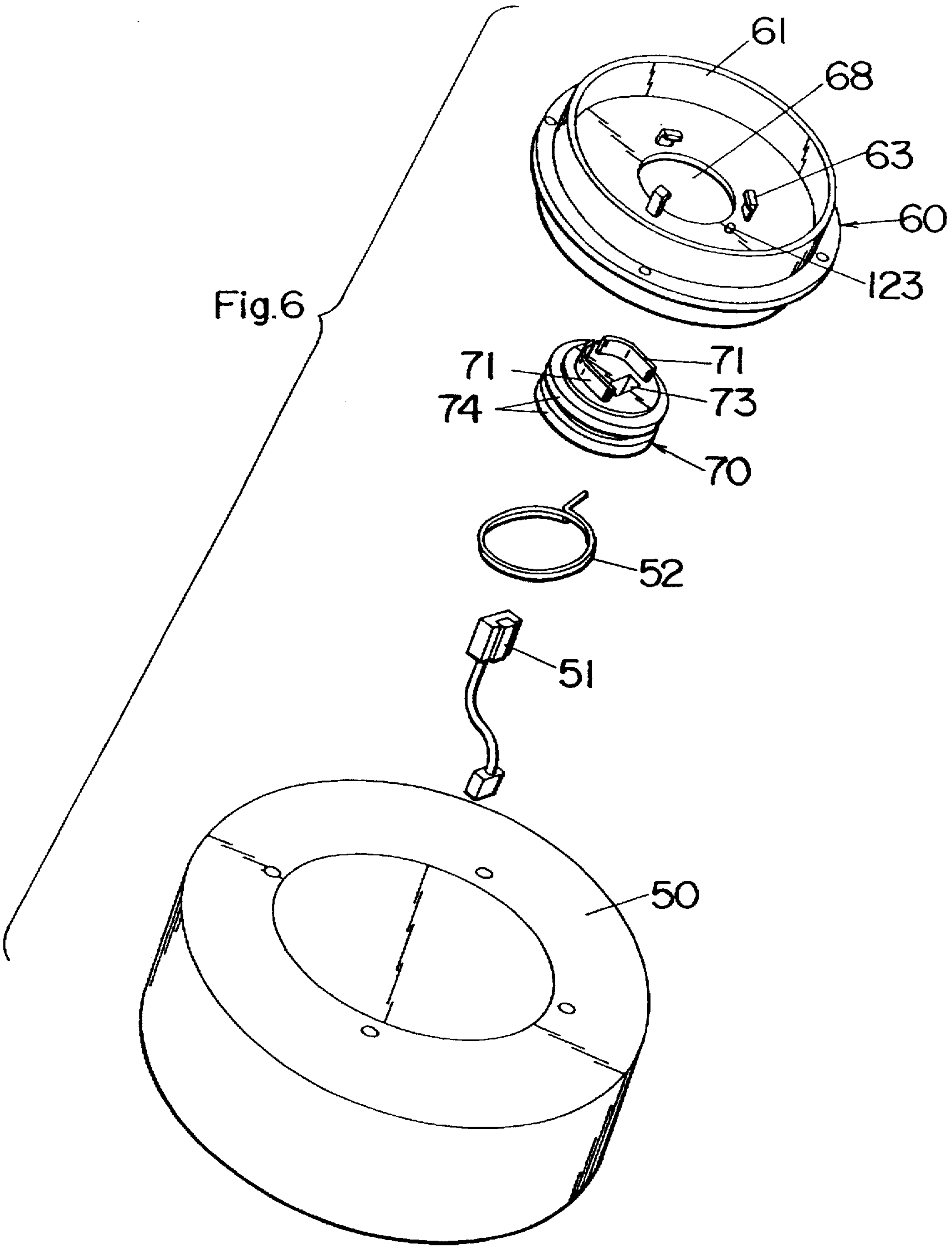
FIG. 6 is an exploded perspective view of the transceiver unit.

As shown in FIGS. 5, 6 and 7A, the transceiver unit 5 comprises a housing 50 for incorporating an electric circuit (not shown) for transmitting and receiving information signal, outer wall member 60 having a circular wall 61, an inner wall member 70 having a pair of guide walls 71, spring 52, and a modular plug 51 adapted to be connected to modular jack 23 of the base unit 4. The outer wall member 60 has a center hole 68 which is concentric with the circular wall 61. A horizontal surface extending within the circular wall 61 is defined as a modular-plug surface 62. The inner wall member 70 is fitted to the center hole 68 of the outer wall member 60 such that the guide walls 71 project on the modular-plug surface 62, as shown in FIG. 5. A height H1 of the circular wall 61 from the modular-plug surface 62 is designed to be lower than the height H2 of the guide wall 71 from the modular-plug surface. As shown in FIGS. 7A and 7B, the inner diameter D1 of the circular wall 61 of the outer wall member 60 is designed to be slightly larger than the diameter D2 of the disk portion 30 of the base unit 4 such that the disk portion can be fitted within the circular wall 61 when the transceiver unit 5 is attached to the base unit 4. It is preferred that a top end of the circular wall 61 is formed with a tapered face toward the inside of the circular wall, so that the disk portion 30 can be readily fitted within the circular wall. The outer wall member 60 is fixed to the housing 50 by screws (not shown).

The guide walls 71 are formed on the inner wall member 70 to make a substantially U-shaped configuration such that the guide walls 71 are allowed to be inserted into the guide grooves 33 of the base unit 4 when opposing to the guide grooves 33 at a particular angular orientation where the U-shaped configuration of the guide walls 71 overlap with that of the guide grooves. That is, the guide walls 71 are provided with a pair of linear walls extending parallel to each other and arcuate walls each extending from the one end of the linear wall, and a notch 72 between the arcuate walls. The modular plug 51 is mounted on the inner wall member 70 within the guide walls 71 such that the modular plug is connected to the modular jack 23 only when the guide walls 71 is inserted into the guide grooves 33. The modular plug 51 is connected to the electric circuit for transmitting and receiving information signal through a hole 73 of the inner wall member 70. A height from the modular-plug surface 62 to a top end of the modular plug 51 is slightly lower than the height H2 of the guide wall 71 to prevent a breakage of the modular plug during operations for attaching the transceiver unit 5 to the base unit 4.

Three hooks 63 made of an electrically conductive material such as copper project on the modular-plug surface 62 around the circular hole 68, and connected to the electric circuit of the transceiver unit 5. The hooks 63 are circumferentially spaced away from each other by 120 degrees about the center of the circular wall 61, as shown in FIG. 7A. When the hooks 63 are inserted into the openings 38, and then moved along the elongate slots 37 by a certain distance, the hooks can be electrically engaged to the output terminals disposed in the elongate slots 37 to supply electric power from the power lines 15 to the electric circuit. At the same time, the hooks 63 can be mechanically engaged to the elongate slots 37 to attach the transceiver unit 5 to the base unit 4.

The inner wall member 70 is rotatably supported to the outer wall member 60 about the center axis of the circular wall 61. A spring 52 is fitted to the inner wall member 70 between a pair of rails 74 extending along the circumference of the inner wall member 70. One end of the spring 52 is fixed to the outer wall member 60 so that the inner wall member 70 receives a spring bias to reproduce a particular position of the inner wall member 70 relative to the outer wall member 60. When the guide walls 71 are inserted in to guide grooves 33 of the base unit 4 at the particular position, the hooks 63 can be also inserted into the openings 38 at the ends of the elongate slots 37.

Figure 8A:
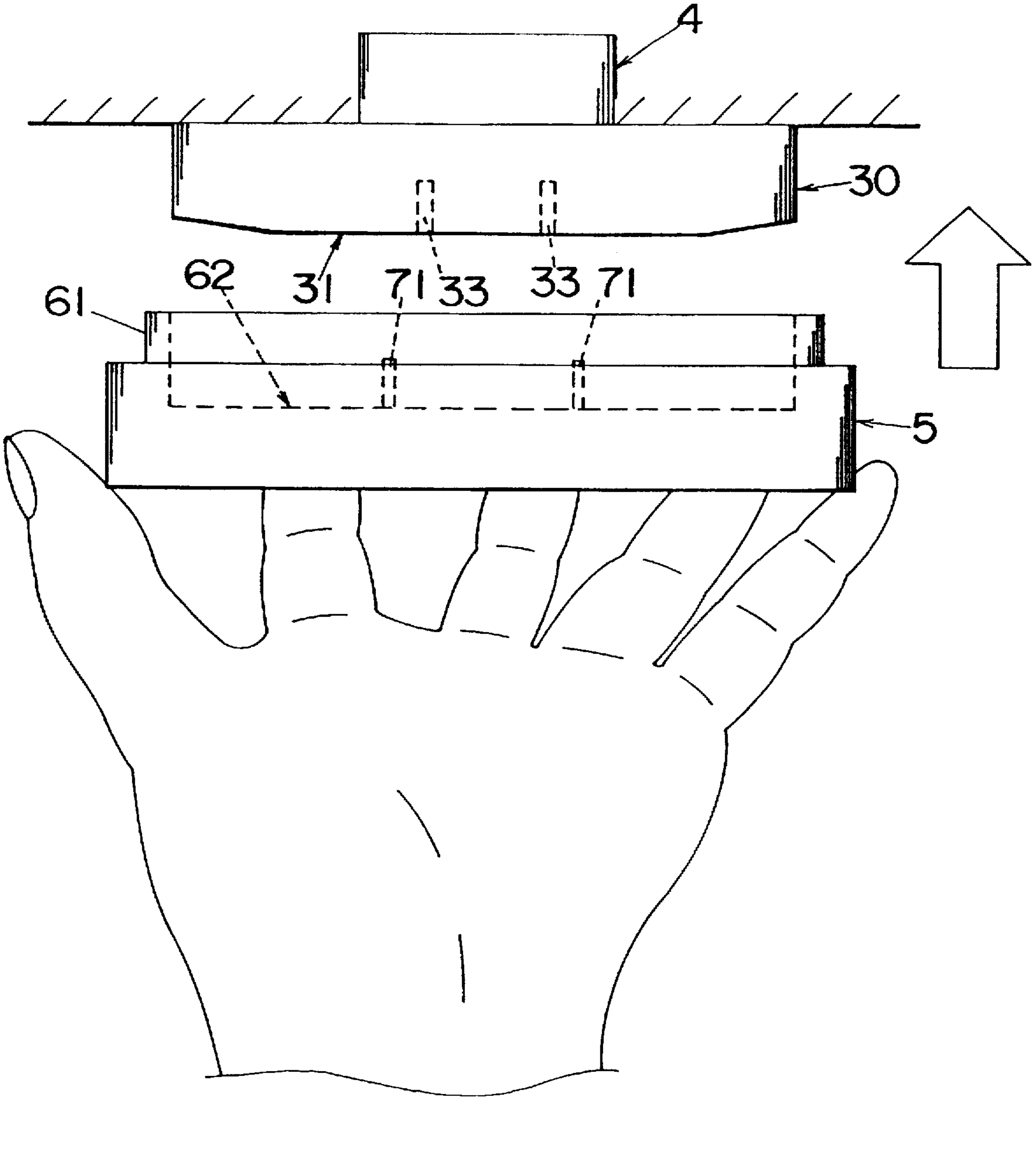
FIGS. 8A to 8G explain operations for attaching the transceiver unit to the base mounted on a ceiling.
Figure 8C:
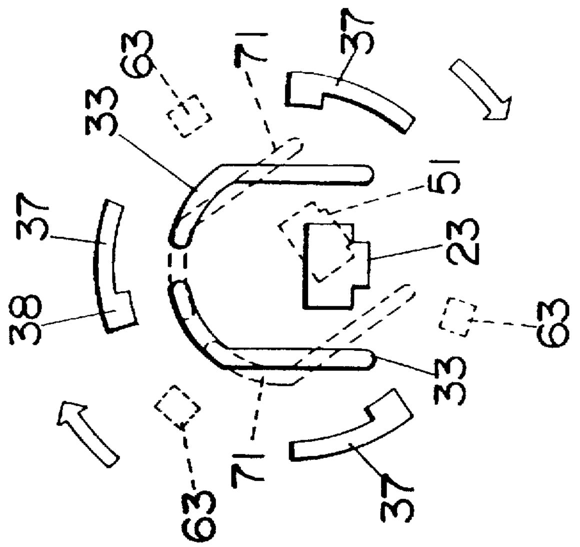
Figure 8B:
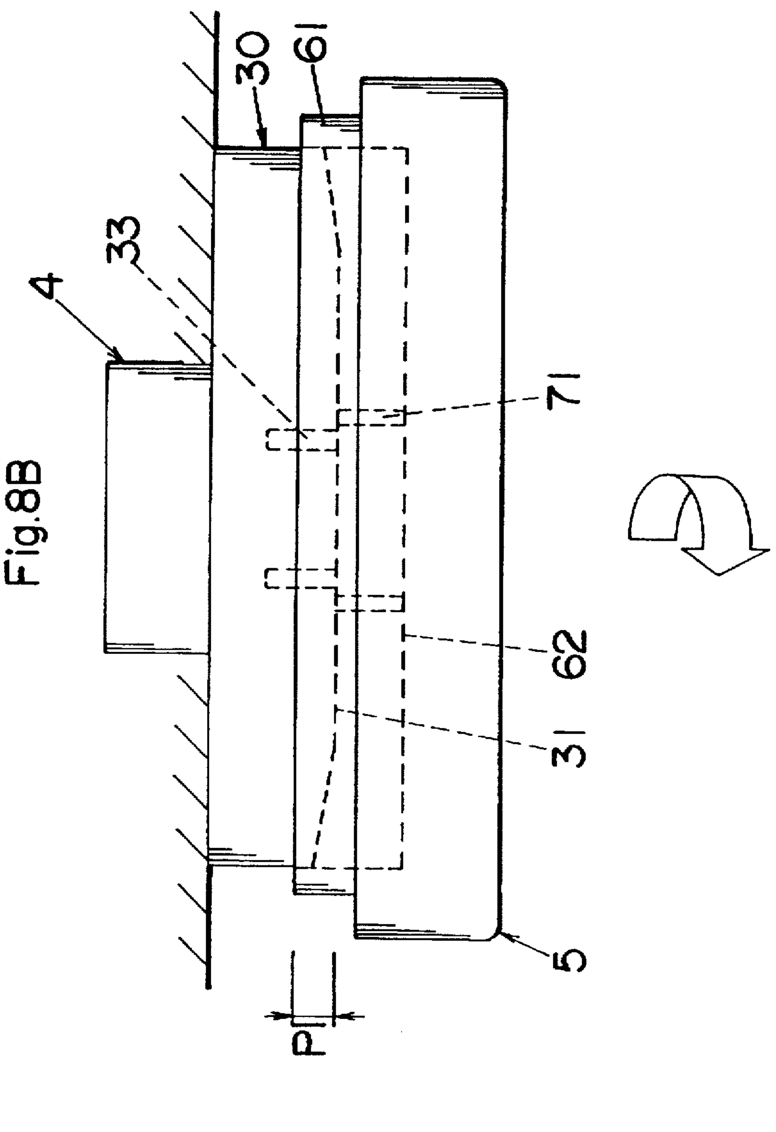
Figure 8E:
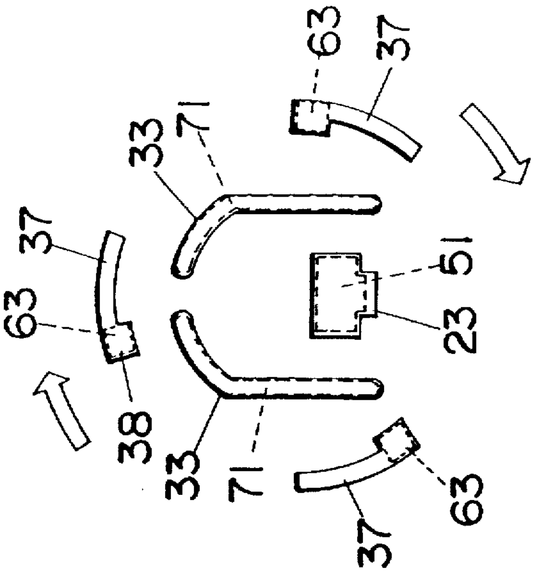
Figure 8D:
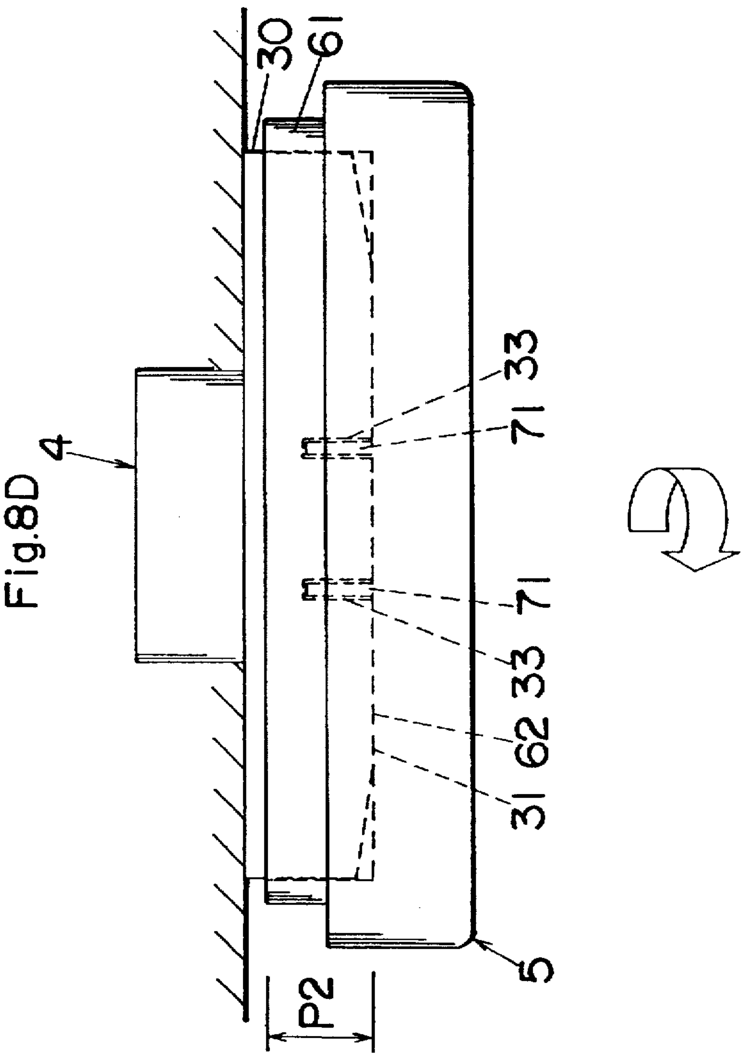
Figure 8G:
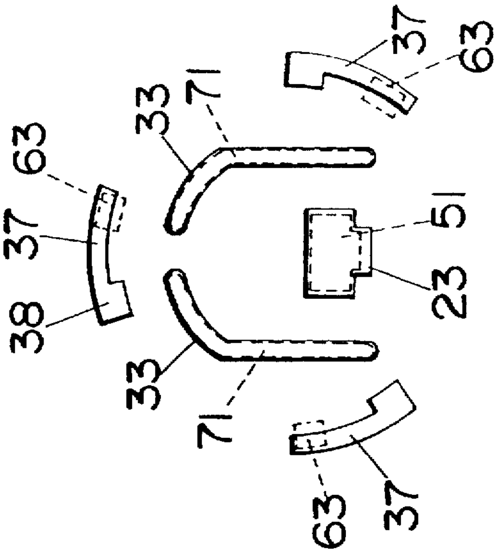
Figure 8F:
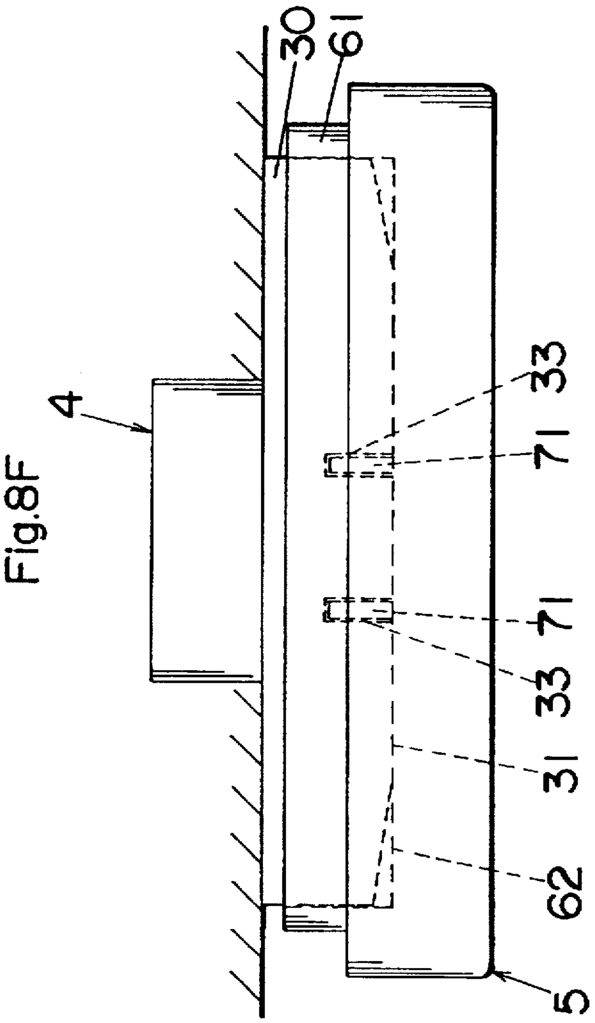

Referring to FIGS. 8A to 8G, operations for attaching the transceiver unit 5 to the base unit 4 mounted to a ceiling of a room are explained below. In FIGS. 8C, 8E and 8G, dotted lines show positions of the guide walls 71, hooks 63 and the modular plug 51 of the transceiver unit 5, and solid lines show positions of the guide grooves 33, elongate slots 37 and the modular jack 23 of the base unit 4.

As shown in FIG. 8A, a user lifts the transceiver unit 5 toward the base unit 4 with the user's hand such that the modular-plug surface 62 of the transceiver unit 5 opposes to the modular-jack surface 31 of the base unit 4. Then, the disk portion 30 of the base unit 4 is fitted within the circular wall 61 of the transceiver unit 5. The disk portion 30 is fitted within the circular wall 61 at a depth P1, as shown in FIG. 8B. Since the disk portion 30 has sufficiently a large diameter, the user can readily fit the disk portion 30 within the circular wall 61. For example, as shown in FIG. 8C, when the disk portion 30 is fitted within the circular wall 61, the guide walls 71 may not oppose to the guide grooves 33 at the particular angular orientation where the U-shaped configuration of the guide walls 71 overlaps with that of the guide grooves 33. In this case, the user must rotate the transceiver unit 5 relative to the base unit 4, for example, in the direction shown by the arrows in FIG. 8C, to overlap the guide walls 71 with the guide grooves 33. In other words, the user can slide the circular wall 61 of the transceiver unit 5 along the circumference of the disk portion 30 of the base unit 4, for example, in the direction of the arrow in FIG. 8B, to thereby find the particular angular orientation of the guide walls 71 relative to the guide grooves 33. Since the transceiver unit 5 is lightly pushed against the base unit 4 during the rotating operation of the transceiver unit 5, the guide walls 71 are inserted into the guide grooves 33 immediately when the guide walls 71 overlaps with the guide grooves 33, as shown in FIG. 8E. As described above, when the guide walls 71 are inserted into the guide grooves 33, the modular plug 51 is connected to the modular jack 23, and at the same time the hooks 63 are inserted into the openings 38 at the ends of the elongate slots 37. When the guide walls 71 are inserted into the guide grooves 33, the disk portion 30 is fitted within the circular wall 61 at a depth P2 larger than the depth P1, as shown in FIG. 8D. Thus, the user can readily connect the modular plug 51 to the modular jack 23 without directly seeing the angular orientation of the guide walls 71 relative to the guide grooves 33 by the user's own eyes. In addition, since the modular jack 23 is connected to the modular plug 51 only when the guide walls 71 are inserted into the guide grooves 33, it is possible to prevent an accidental collision of the modular plug 51 with the modular jack 23 at a wrong angular orientation.

Subsequently, the transceiver unit 5 is further rotated relative to the base unit 4 about the center axis of the circular wall 61 by a certain angular distance, in the direction of the arrow in FIG. 8D, so that the hooks 63 are moved along the elongate slots 37, as shown by the arrows of FIG. 8E, to engage to the output terminals (not shown) disposed in the elongate slots 37 at the positions shown in FIG. 8G. As a result, the electric circuit of the transceiver unit 5 is fed with electric power from the power lines through the hooks 63. At the same time, the transceiver unit 5 is mechanically supported to the base unit 4 by the engagement between the hooks 63 and the elongate slots 37. The outer wall member 60 of the transceiver unit 5 is rotated relative to the base unit 4 about the center axis of the circular wall 61 to engage the hooks 63 to the output terminals in the elongate slots 37. However, since the inner wall member 70 is rotatably supported to the outer wall member 60, as described above, the inner wall member 70 is not rotated relative to the base unit 4 to keep the connection of the modular plug 51 with the modular jack 23. Therefore, it is possible to finish the rotating operation of the transceiver unit 5 to engage the hooks 63 to the elongate slots 37 without giving a torsional moment to the modular plug 51 connected to the modular jack 23.

As understood from the above operations for attaching the transceiver unit 5 to the base unit 4, the user has only to go up a footstool or the like at a height where the transceiver unit 5 lifted overhead with the user's hand reaches to the base unit 4 mounted to the ceiling. As compared with the case that the user must go up a footstool or the like at a higher position where the user can directly see an angular orientation of the modular plug 51 relative to the modular jack 23 by the user's own eyes, the device of the present invention can provide to the user a safe and easy working condition for attaching the transceiver unit 5 to the base unit 4 mounted on the ceiling.

By the way, the transceiver unit 5 includes expensive parts and electric circuit, therefore, it is desired to prevent an accidental fall by earthquake or a robbery of the transceiver unit 5 from the base unit 4. In FIG. 5, the numeral 123 designates a retractable pin of a lock device 100 equipped to the outer wall member 60 at the opposite surface of the modular-plug surface 62. When the hooks 63 are engaged to the elongate slots 37 is finished, the retractable pin 123 projecting on the modular-plug surface 62 falls into a cavity 36 formed in the modular-jack surface 31 to prevent a further rotational movement of the transceiver unit 5 relative to the base unit 4. In other words, the user can not rotate the transceiver unit 5 relative to the base unit 4 to detach the transceiver unit 5 from the base unit 4 unless the pin 123 is removed from the cavity 36.

Figure 9:
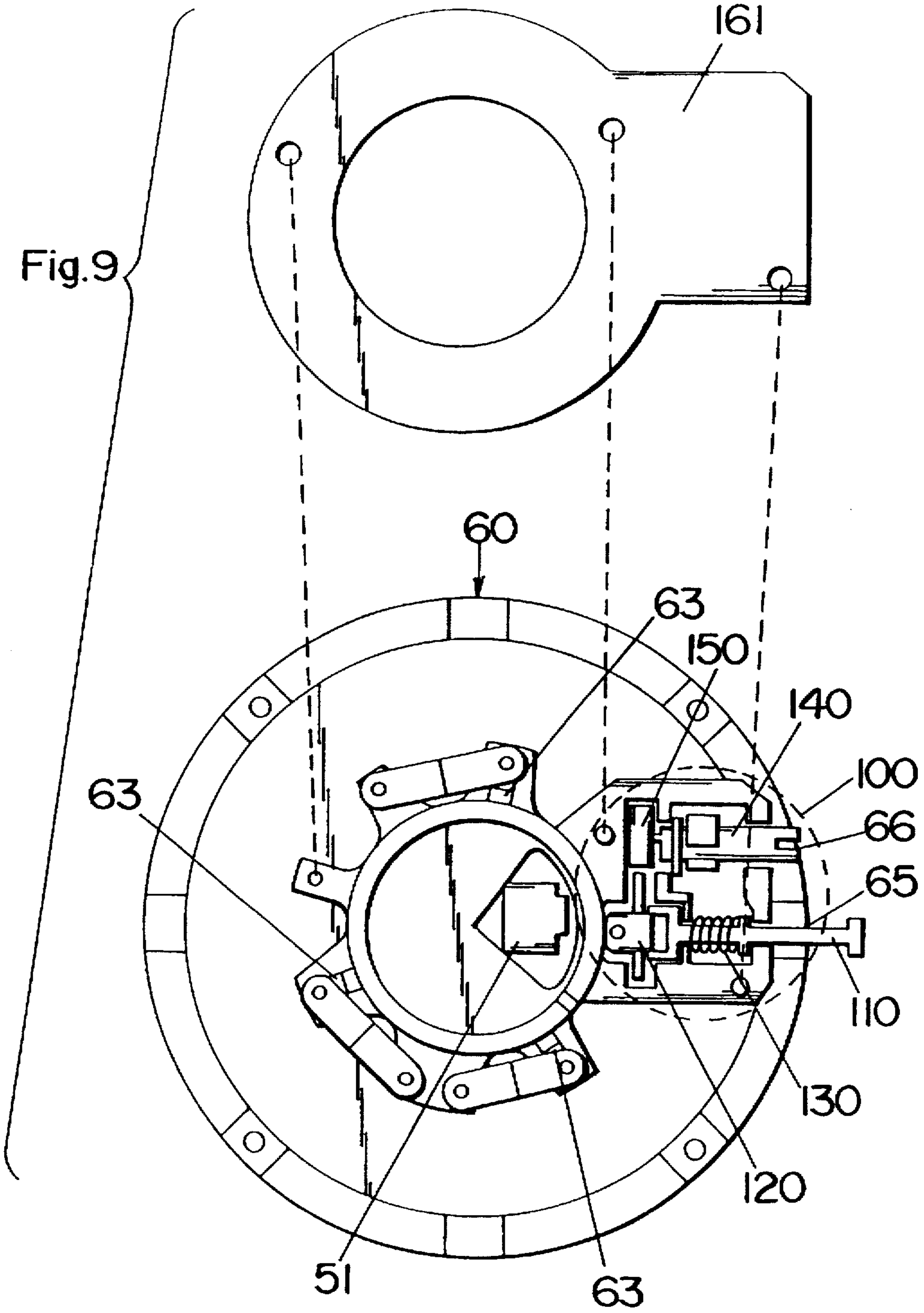
FIG. 9 shows a lock device mounted in the transceiver unit.
Figure 10:
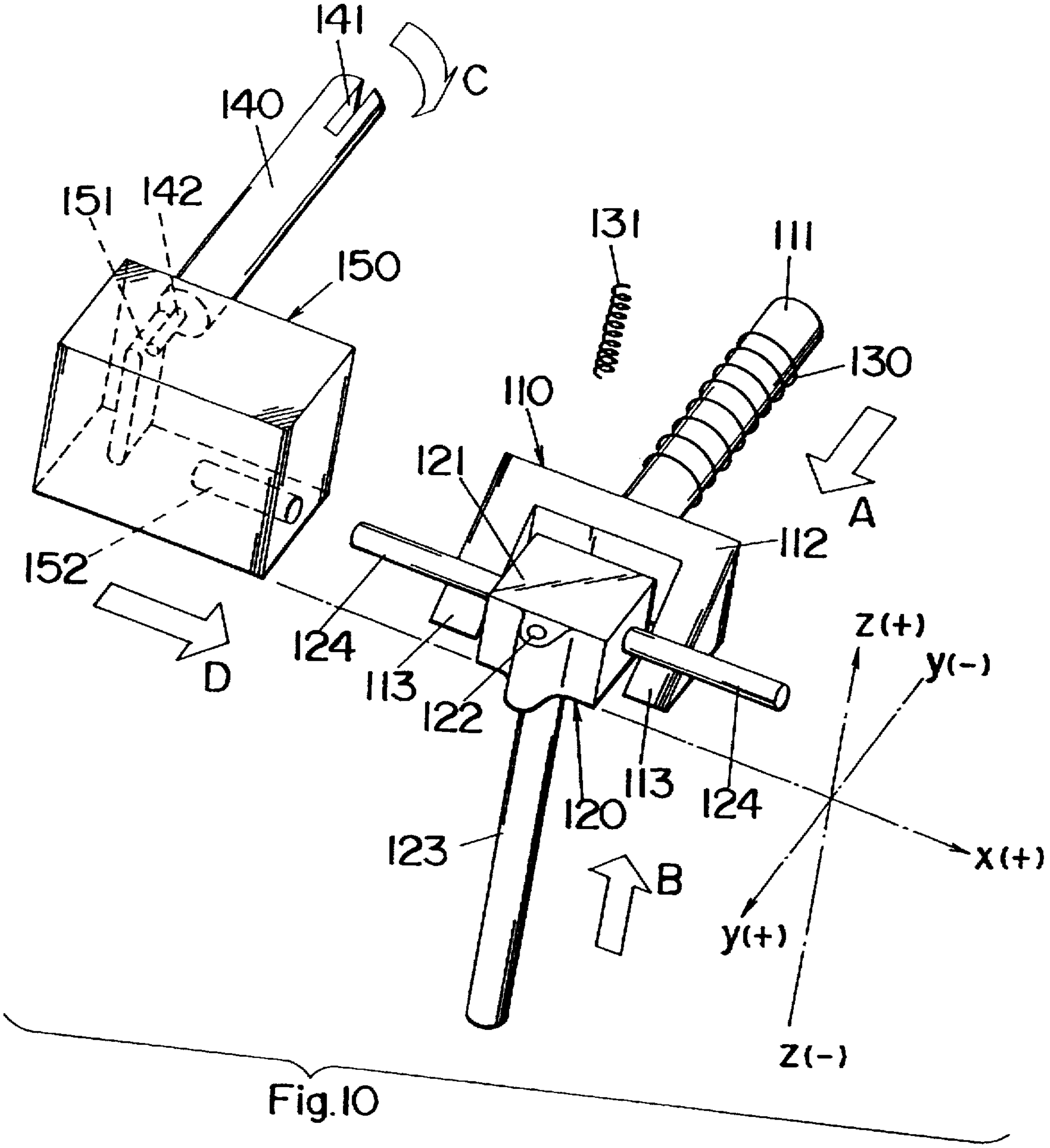
FIG. 10 is an exploded perspective view of the lock device.

The lock device 100 is explained in detail, referring to the drawings of FIGS. 9 and 10. A perpendicular coordinate system of X-, Y- and Z-axes is defined in FIG. 10 to enhance the understanding of the lock device 100. The lock device 100 comprises a release member 110, lock member 120, first spring 130, and a second spring 131. The release member 110 is formed with a release shaft 111 to which the first spring 130 is fitted, and a head 112 having a pair of tapered arms 113, as shown in FIG. 10. The lock member 120 is formed with a rigid body 121 having a dent 122 for receiving the second spring 131, a pair of horizontal rods 124 projecting from the rigid body 121 in the opposite directions on the X-axis, and the pin 123 projecting from the rigid body 121 perpendicularly to the horizontal rods 124. The lock member 120 is disposed on the outer wall member 60 such that the pin 123 projects on the modular-plug surface 62. The second spring 131 is supported between the dent 122 of the rigid body 121 and a cover board 161 to provide a spring bias to the lock member 120 in the Z(−) direction to determine a projecting position of the pin 123 on the modular-plug surface 62.

The release member 110 is disposed on the outer wall member 60 such that a free end of the release shaft 111 projects from a hole 65 of the outer wall member 60 by a spring bias of the first spring 130. When the release shaft 111 is moved toward the rigid body 121 against the spring bias of the first spring 130, as shown by the arrow A of FIG. 10, the horizontal rods 124 contact with the arms 113 of the release member 110, and then are lifted along slopes of the tapered arms, so that the lock member 120 is moved upward, as shown by the arrow B, to determine a retracted position of the pin 123 on the modular-plug surface 62. Since the pin 123 is removed from the cavity 36 in the modular jack surface 62 at the retracted position, it is possible to rotate the transceiver unit 5 relative to the base unit 4 to detach the transceiver unit 5 from the base unit 4. In other words, the user can detach the transceiver unit 5 from the base unit 4 by rotating the transceiver unit 5 relative to the base unit 4 while pushing the release shaft 111 against the spring bias of the first spring 130. On the other hand, when the user's finger is released from the release shaft 111, the lock member 120 is moved in the Z(−) direction by the spring bias of the second spring 131 to take the projecting position of the pin 123.

The lock device 100 also comprises a key shaft 140 and slider 150. The key shaft 140 has a key groove 141 at its one end and an eccentric pin 142 at the other end. The slider 150 has an elongate groove 151 for receiving the eccentric pin 142 and a horizontal hole 152 for receiving the horizontal rod 124 of the lock member 120. The key shaft 140 is arranged on the outer wall member 60 such that the key shaft projects in a key hole 66 of the outer wall member 60 and the eccentric pin 142 is inserted into the elongate groove 151 of the slider 150. The horizontal hole 152 is formed in the slider 150 in such a height that a center axis of the horizontal hole 152 is consistent with that of the horizontal rod 124 when the pin 123 is in the projecting position on the modular plug surface 62. When the key shaft 140 is rotated over a certain distance in the direction shown by the arrow C of FIG. 10, the slider 150 is moved toward the lock member 120 in the direction of the arrow D by the eccentric pin 142 engaged to the elongate groove 151, so that the horizontal hole 152 comes to receive the horizontal rod 124 when the pin 123 is in the projecting position. As a result, the movement of the pin 123 from the projecting position to the retracted position can be prevented by the slider 150. In other words, when the horizontal rod 124 is inserted into the horizontal hole 152, the user can not push the release shaft 111 to detach the transceiver unit 5 from the base unit 4. Since the key shaft 140 can be moved only by the use of an exclusive key (not shown), it is possible to prevent a robbery of the transceiver unit 5 from the base unit 4.

[SECOND EMBODIMENT]

A device for transmitting and receiving information signal of the second embodiment of the present invention is substantially same as the device explained in the first embodiment except for the following structures. Therefore, no duplicate explanation to common parts and operations is deemed necessary. Like parts are designated by like numerals with a suffixed letter of "A".

Figure 11A:
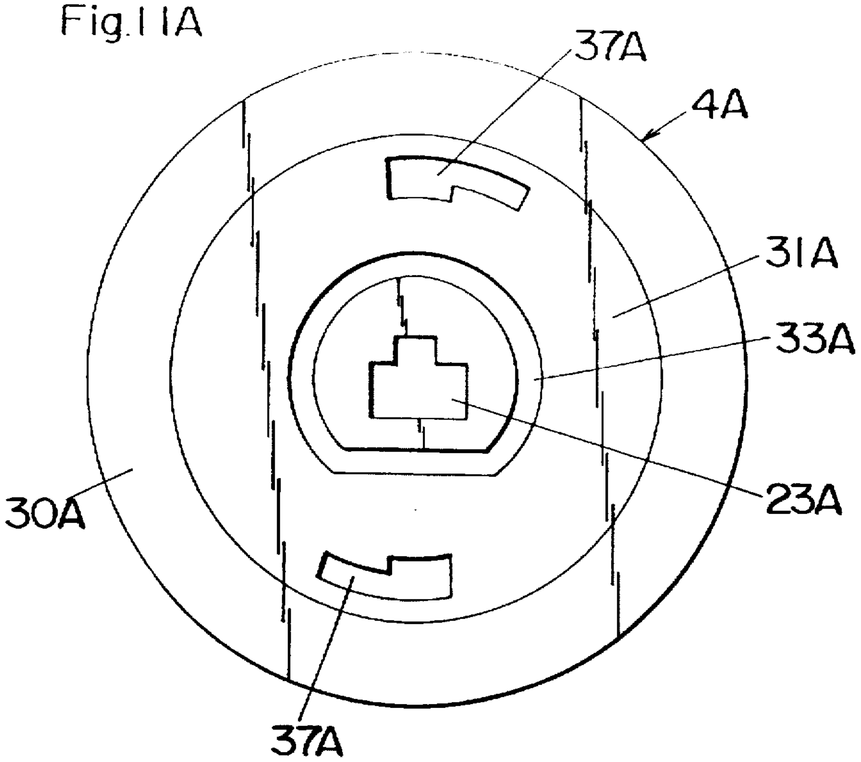
FIGS. 11A and 11B are to plan views of a transceiver unit and base unit of a second embodiment of the present invention, respectively.
Figure 11B:
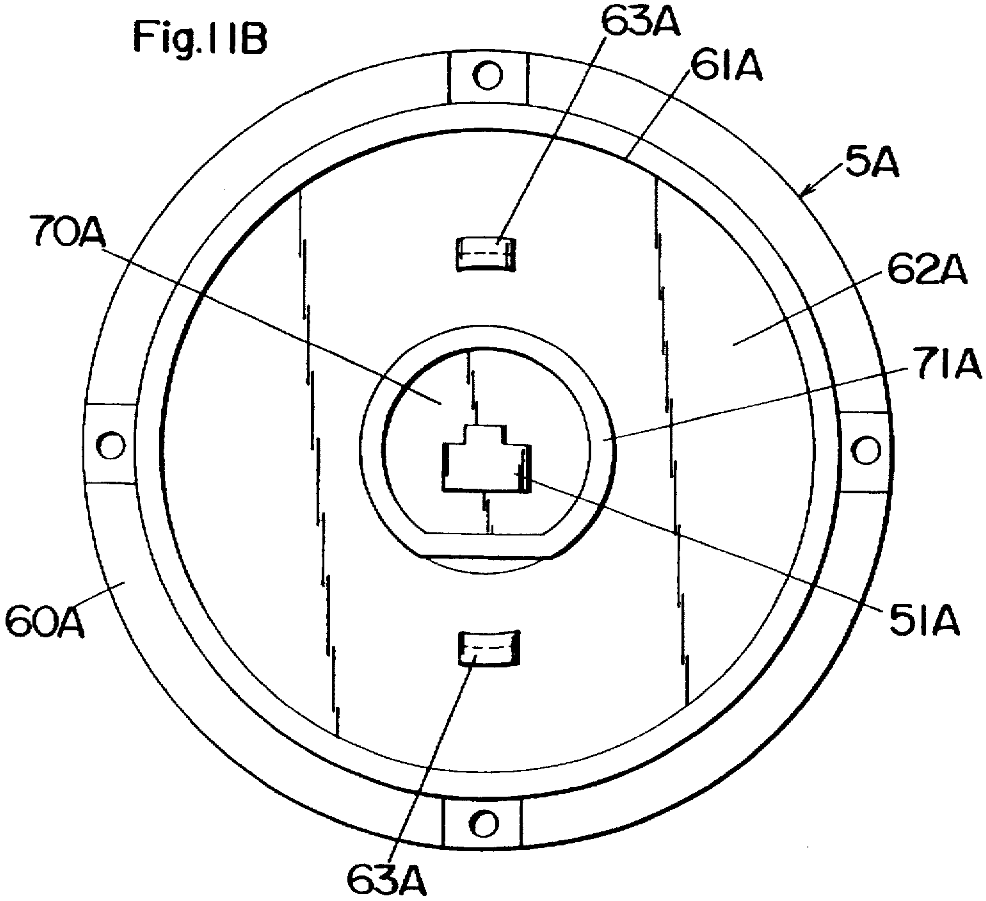

As shown in FIG. 11B, a guide wall 71A of a transceiver unit 5A is formed in a generally D-shaped configuration. A modular plug 51A is mounted on an inner wall member 70A within the guide wall 71A. As shown in FIG. 11A, a guide groove 33A of a base unit 4A is formed in a generally D-shaped configuration such that the guide wall 71A is allowed to be inserted into the guide groove 33A only when opposing to the guide groove at a particular angular orientation where the D-shaped configuration of the guide wall 71A overlaps with that of the guide groove 33A. In addition, the transceiver unit 5A has a pair of hooks 63A made of an electrically conductive material and projecting on a modular-plug surface 62A of the transceiver unit 5A. The hooks 63A are circumferentially spaced away from each other by 180 degrees about a center axis of a circular wall 61A of an outer wall member 60A of the transceiver unit 5A. The base unit 4A has a pair of slots 37A formed in a modular jack surface 31A of a disk portion 30A of the base unit 4A such that the hooks 63A can be inserted into the slots only when the guide wall 71A is inserted into the guide groove 33A.

Figure 12:
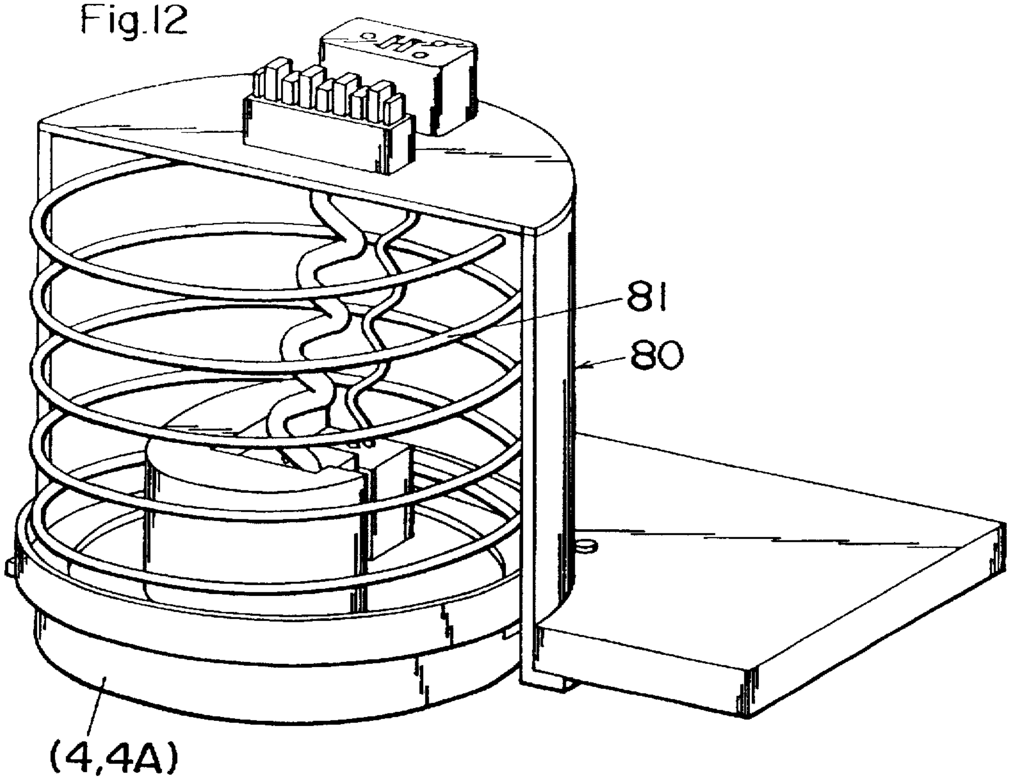
FIG. 12 is a perspective view of a base unit held in a case at a projecting position.
Figure 13:
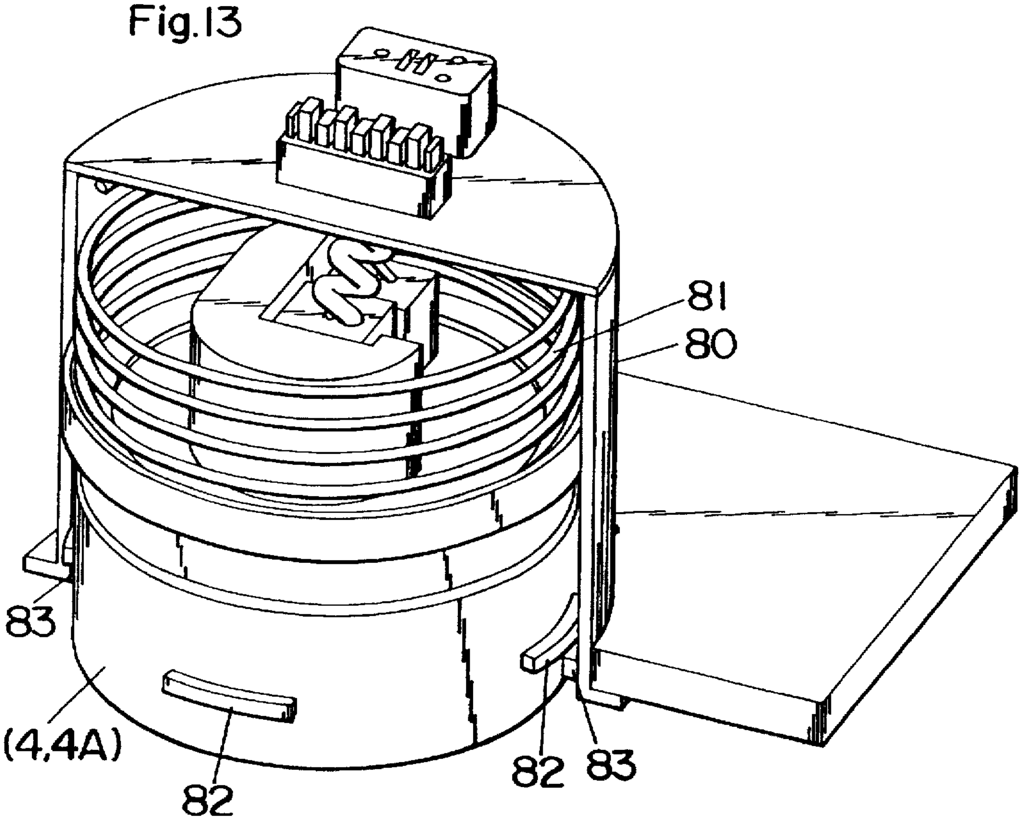
FIG. 13 is a perspective view of the base unit held in the case at a retracted position.

In these embodiments, it is preferred that the base unit (4, 4A) is movably supported to a case 80, as shown in FIGS. 12 and 13, to improve a problem that the transceiver unit (5, 5A) attached to the base unit spoils the beauty of the room. That is, the case 80 is fixed in a wall or ceiling of the room to movably support the base unit between a projecting position where the base unit projects on the wall, as shown in FIG. 12, and a retracted position where the base unit retracts within the wall, as shown in FIG. 13. A bias is given to the base unit (4, 4A) by a spring 81 connected between the base unit and the case 80 to hold the base unit at the projecting position. The disk portion (30, 30A) of the base unit is exposed to the room at the projecting position such that the disk potion can be readily fitted within the circular wall (61, 61A) of the transceiver unit. On the other hand, when the transceiver unit is attached to the base unit, the base unit is moved to the retracted position. Since first projections 82 of the base unit are engaged to second projections 83 of the case 80, as shown in FIG. 13, the base unit can be stably supported at the retracted position. Thus, the present device with the case 80 can improve the problem that the transceiver unit (5, 5A) attached to the base unit (4, 4A) spoils the beauty of the room.

[THIRD EMBODIMENT]

A device for transmitting and receiving information signal of the third embodiment of the present invention is substantially same as the device explained in the first embodiment except for the following structures. Therefore, no duplicate explanation to common parts and operations is deemed necessary. Like parts are designated by like numerals with a suffixed letter of "B".

Figure 14:
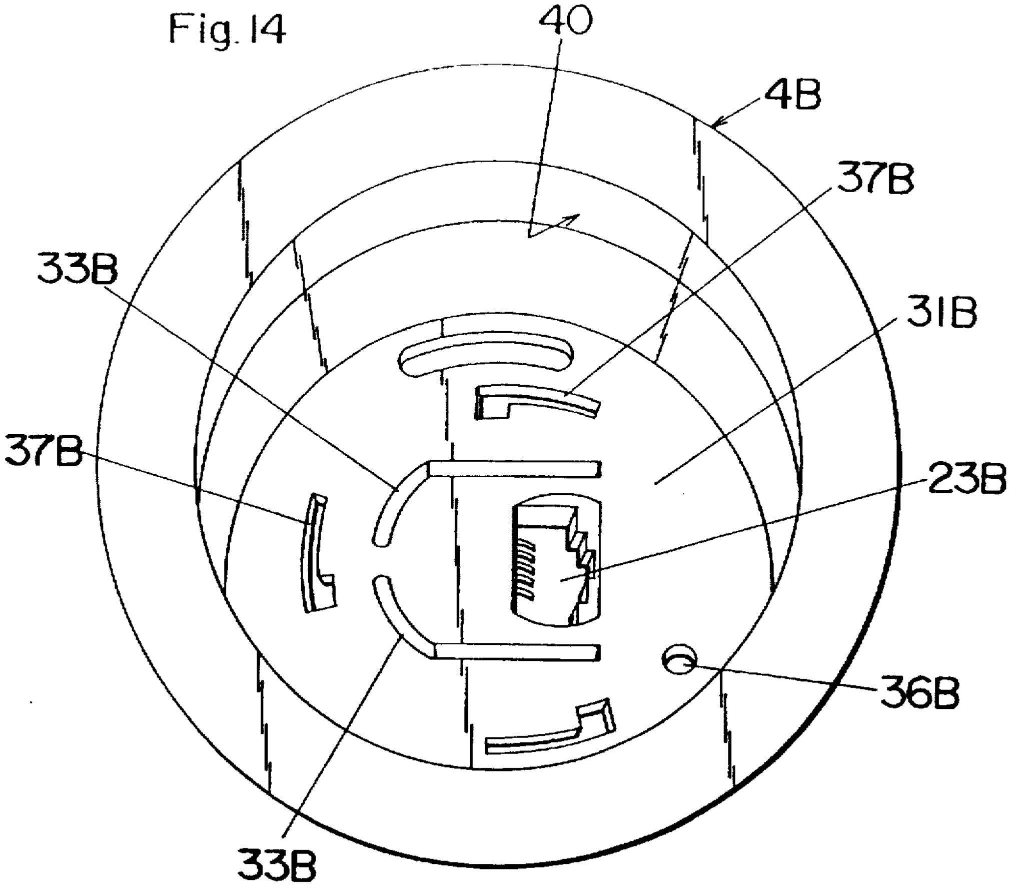
FIG. 14 is a perspective view of a base unit of a third embodiment of the present invention.
Figure 15:
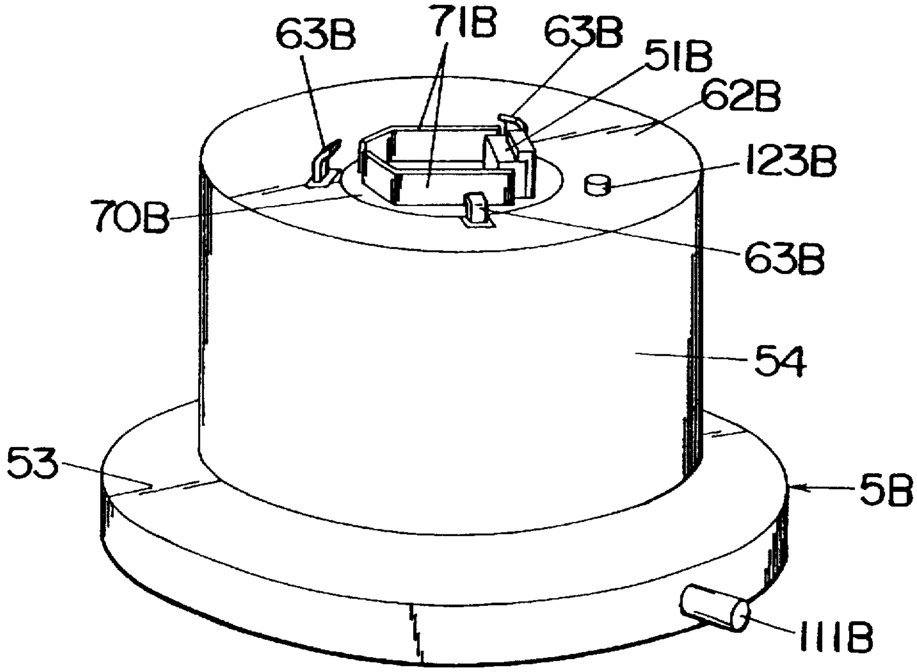
FIG. 15 is a perspective view of a transceiver unit of the third embodiment.
Figure 16:
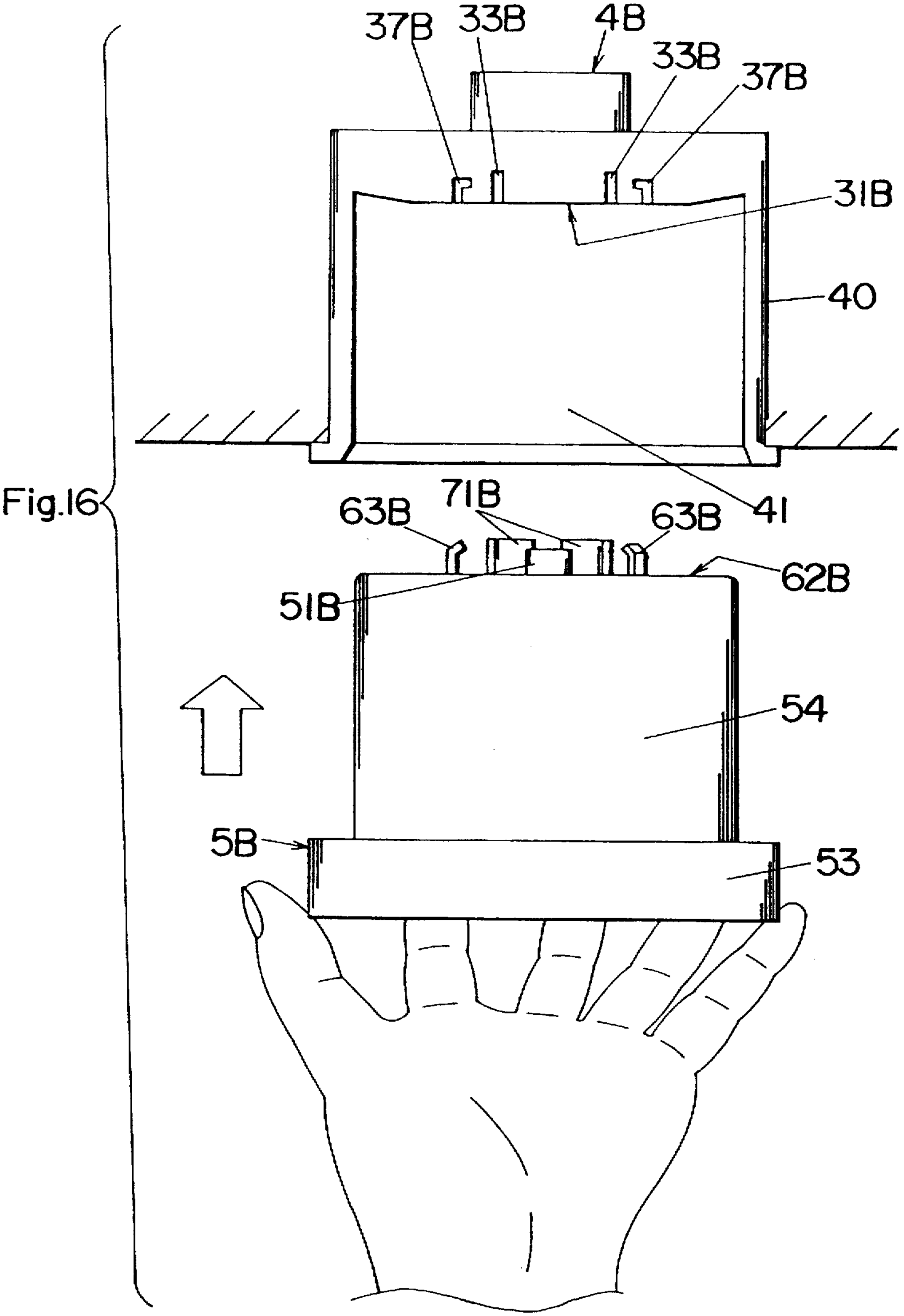
FIG. 16 shows an operation for attaching the transceiver unit to the base mounted on a ceiling.

A base unit 4B has a modular-jack surface 31B, and a cylindrical wall 40 projecting on the modular-jack surface 31B and having a top opening 41, as shown in FIGS. 14 and 16. Arrangements of a modular jack 23B, elongate slots 37B and a cavity 36B relative to guide grooves 33B in the modular-jack surface 31B are the same as those in the modular-jack surface 31 of the first embodiment. The base unit 4B is mounted to a ceiling or wall of a room such that the modular-jack surface 31B is exposed to the room through the top opening 41, as shown in FIG. 16.

On the other hand, a transceiver unit 5B is formed with a disk plate 53 and a columnar stand 54 projecting on the disk plate 53. An electric circuit for transmitting and receiving information signal is incorporated in the columnar stand 54. A modular-plug surface 62B is defined on a top surface of the columnar stand 54. Arrangements of a modular plug 51B, hooks 63B and a retractable pin 123B relative to guide walls 71B on the modular-plug surface 62B are the same as those on the modular-plug surface 62 of the first embodiment. A diameter of the columnar stand 54 is designed to be slightly smaller than the inner diameter of the cylindrical wall 40 of the base unit 4B, so that the columnar stand 54 can be fitted within the cylindrical wall 40 when the transceiver unit 5B is attached to the base unit 4B. The numeral 111B designates a release button of a lock device for keeping the transceiver unit 5B secured to the base unit 4B.

As shown in FIG. 16, a user lifts the transceiver unit 5B toward the base unit 4B with the user's hand such that the modular-plug surface 62B opposes to the modular-jack surface 31B, and then fit the columnar stand 54 within the cylindrical wall 40. The user can readily insert the guide walls 71B into the guide grooves 33B in substantially a same manner as the first embodiment by sliding the columnar stand 54 along the cylindrical wall 40, while lightly pushing the transceiver unit 5B against the base unit 4B. In addition, an operation for mechanically and electrically engaging the hooks 63B to the elongate slots 37B is substantially same as the operation explained in the first embodiment.

As a result, the device of this embodiment can provide a safe and easy working condition for attaching the transceiver unit 5B to the base unit 4B mounted to a wall or ceiling, and particularly improve the problem that the transceiver unit attached to the base unit spoils the beauty of the room.

What is claimed is:

1. A device for receiving and transmitting information signal in a multimedia communication system including a transceiver unit for transmitting and receiving the information signal to and from the inside of a room, said device comprising:

a base unit adapted to be mounted to a wall of the room to detachably support said transceiver unit, said base unit having a receptacle electrically connected to an information transmission line routed within the wall;

said transceiver unit comprising circuit means for transmitting and receiving the information signal and a housing with a plug and hooks, said plug being electrically connected to said circuit means and projecting on a plug surface defined on said housing to be detachably connected to said receptacle for establishing a signal communication between said circuit means and said information transmission line, said hooks projecting on said plug surface to detachably engage into corresponding grooves formed in said base unit for supporting said transceiver unit to said base unit; wherein the present invention is characterized in that:

said base unit comprising a disk member which is provided with sail receptacle and said grooves exposed in a receptacle surface defined on said disk member;

said housing is formed with a circular wall projecting on said plug surface to surround said plug and hooks, and a guide wall projecting on said plug surface inside said circular wall and around said plug;

said disk member has a diameter slightly smaller than an inner diameter of said circular wall so that said disk member can fit within said circular wall when said transceiver unit is attached to said base; and that said disk member is formed in said receptacle surface with a guide groove of such a configuration that said guide wall is allowed to be inserted into said guide groove only when said guide wall opposes to said guide groove at a particular angular orientation where said plug comes to be connectable with said receptacle.

2. A device as set forth in claim 1, wherein said receptacle is in the form of a modular jack.

3. A device as set forth in claim 1, wherein said guide wall is formed into a generally U-shaped configuration.

4. A device as set forth in claim 1, wherein said guide wall is formed into a generally D-shaped configuration.

5. A device as set forth in claim 3, wherein said guide wall is formed with a pair of linear walls extending parallel to each other and an arcuate wall extending between said linear walls and having a notch, and wherein a projection is formed in said guide groove such that said guide wall is allowed to be inserted into said guide groove when said projection is fitted to said notch.

6. A device as set forth in claim 1, wherein said housing of the transceiver unit comprises a stationary portion defined by a part of said plug surface on which said guide wall and said plug project, and a rotatable portion rotatably relative to said stationary portion about a center axis of said circular wall, said rotatable portion carrying said hooks such that said hooks are allowed to engage to the grooves in said receptacle surface when said rotatable portion is rotated relative to the stationary portion by a certain angular distance, while the plug being kept connected with the receptacle.

7. A device as set forth in claim 1, further including:

a case which is fixed in said wall to movably support said base unit between a projecting position where said disk member projects on said wall and a retracted position where said disk member retract within said wall;

spring means connected between said base unit and said case to bias said base unit toward said projecting position; and catch means for keeping said base unit into said retracted position when said transceiver unit is attached to said base unit.

8. A device as set forth in claim 1, wherein said base unit includes a power terminal to be connected to a power line routed within the wall, and wherein said hooks are made of electrically conductive material, connected to said circuit means of said transceiver unit, and engaged with said power terminal when said transceiver unit is attached to said base unit by the engagement of said hooks into said grooves, so that said circuit means is fed with electric power from said power line through said hooks.

9. A device as set forth in claim 6, including lock means for keeping said transceiver unit secured to said base unit, said lock means comprising:

a cavity formed in said receptacle surface of said base unit;

a retractable pin projecting on said plug surface of said transceiver unit such that said pin is inserted into said cavity when said hooks are engaged into said grooves;

a spring for providing a spring bias to said pin in the projecting direction; and a release unit for moving said pin in the opposite direction of said projecting direction against said spring bias, said release unit having a release button which projects from said transceiver unit such that said pin is removed from said cavity by said release unit when said release button is pushed.

10. A device for receiving and transmitting information signal in a multimedia communication system including a transceiver unit for transmitting and receiving the information signal to and from the inside of a room, said device comprising:

a base unit adapted to be mounted to a wall of the room to detachably support said transceiver unit, said base unit having a receptacle electrically connected to an information transmission line routed within the wall;

said transceiver unit comprising circuit means for transmitting and receiving the information signal and a housing with a plug and hooks, said plug being electrically connected to said circuit means and projecting on a plug surface defined on said housing to be detachably connected to said receptacle for establishing a signal communication between said circuit means and said information transmission line, said hooks projecting on said plug surface to detachably engage into corresponding grooves formed in said base unit for supporting said transceiver unit to said base unit; wherein the present invention is characterized in that:

said base unit has a receptacle surface in which said receptacle and said grooves exposed;

a cylindrical wall projects on said receptacle surface to surround said receptacle and said grooves;

a guide groove is formed in said receptacle surface inside said cylindrical wall and around said receptacle;

said housing has a columnar stand on which said plug surface is defined, said columnar stand having a diameter slightly smaller than an inner diameter of said cylindrical wall so that said columnar stand can fit within said cylindrical wall when said transceiver unit is attached to said base; and that said columnar stand has a guide wall projecting on said plug surface in such a configuration that said guide wall is allowed to be inserted into said guide groove only when said guide wall opposes to said guide groove at a particular angular orientation where said plug comes to be connectable with said receptacle.

* * * * *